US011034819B2

(12) United States Patent (10) Patent No.: US 11,034,819 B2
Tsou et al. (45) Date of Patent: Jun. 15, 2021

(54) SELF-ASSEMBLED PROPYLENE-BASED COMPOSITIONS AND METHODS OF PRODUCTION THEREOF

(71) Applicant: ExxonMobil Chemical Patents Inc., Baytown, TX (US)

(72) Inventors: Andy H. Tsou, Houston, TX (US); John R. Hagadorn, Houston, TX (US); Viktor Buchholz, Clinton, NJ (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/387,293

(22) Filed: Dec. 21, 2016

(65) Prior Publication Data

US 2017/0240725 A1 Aug. 24, 2017

Related U.S. Application Data

(60) Provisional application No. 62/299,195, filed on Feb. 24, 2016.

(51) Int. Cl.
| | | |
|---|---|---|
| C08K 7/08 | (2006.01) | |
| B32B 27/06 | (2006.01) | |
| C08F 110/06 | (2006.01) | |
| C08J 3/20 | (2006.01) | |
| C08K 7/14 | (2006.01) | |
| C08K 9/06 | (2006.01) | |
| C08J 3/24 | (2006.01) | |
| C08F 8/12 | (2006.01) | |
| C08F 8/46 | (2006.01) | |
| C08L 23/36 | (2006.01) | |
| C08K 7/02 | (2006.01) | |
| C08F 8/32 | (2006.01) | |
| C08K 3/04 | (2006.01) | |
| C08K 7/06 | (2006.01) | |
| C08J 5/04 | (2006.01) | |
| C08L 51/06 | (2006.01) | |
| C08F 4/659 | (2006.01) | |
| C08F 4/6592 | (2006.01) | |

(52) U.S. Cl.
CPC .............. *C08K 7/08* (2013.01); *B32B 27/06* (2013.01); *C08F 8/12* (2013.01); *C08F 8/32* (2013.01); *C08F 8/46* (2013.01); *C08F 110/06* (2013.01); *C08J 3/203* (2013.01); *C08J 3/246* (2013.01); *C08J 5/04* (2013.01); *C08J 5/044* (2013.01); *C08K 3/041* (2017.05); *C08K 3/046* (2017.05); *C08K 7/02* (2013.01); *C08K 7/06* (2013.01); *C08K 7/14* (2013.01); *C08K 9/06* (2013.01); *C08L 23/36* (2013.01); *C08L 51/06* (2013.01); *B32B 2250/02* (2013.01); *C08F 4/65908* (2013.01); *C08F 4/65912* (2013.01); *C08F 4/65927* (2013.01); *C08F 2500/15* (2013.01); *C08F 2810/40* (2013.01); *C08J 2323/12* (2013.01); *C08J 2323/36* (2013.01); *C08J 2400/26* (2013.01); *C08J 2423/12* (2013.01); *C08J 2451/06* (2013.01); *C08K 2201/011* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 5,001,197 A | * | 3/1991 | Hendewerk | C08F 255/00 525/263 |
| 8,618,214 B2 | | 12/2013 | Tsou et al. | |
| 2006/0172647 A1 | * | 8/2006 | Mehta | C08L 23/10 442/327 |
| 2007/0254122 A1 | * | 11/2007 | Inoue | C08L 23/10 428/35.7 |
| 2011/0263778 A1 | * | 10/2011 | Honma | C08L 23/10 524/495 |
| 2011/0288236 A1 | * | 11/2011 | Luan | C08L 51/06 525/71 |
| 2012/0157631 A1 | * | 6/2012 | Tsou | C08J 5/042 525/98 |
| 2012/0251749 A1 | * | 10/2012 | Lee | C08J 5/18 428/35.2 |
| 2013/0011669 A1 | * | 1/2013 | Lu | B32B 27/32 428/349 |
| 2013/0221569 A1 | | 8/2013 | Probst et al. | |
| 2013/0323513 A1 | * | 12/2013 | Hubbard | B32B 15/085 428/424.2 |

FOREIGN PATENT DOCUMENTS

| | | |
|---|---|---|
| JP | 2008036932 | 2/2008 |
| WO | 03/027479 | 4/2003 |
| WO | 2012/083014 | 6/2012 |
| WO | 2013/191307 | 12/2013 |

* cited by examiner

*Primary Examiner* — Ronak C Patel

(57) ABSTRACT

Disclosed are self-assembled propylene-based bi-layer compositions having a skin layer comprising a propylene-based elastomer-toughened composition and a core layer comprising a propylene-based fiber-reinforced composition, wherein the propylene-based elastomer-toughened composition and propylene-based fiber-reinforced composition self-assemble upon mixing into the skin layer and the core layer. Processes for producing these self-assembled propylene-based compositions are also disclosed.

20 Claims, No Drawings

SELF-ASSEMBLED PROPYLENE-BASED COMPOSITIONS AND METHODS OF PRODUCTION THEREOF

PRIORITY

This invention claims priority to and the benefit of U.S. Patent Application Ser. No. 62/299,195, filed Feb. 24, 2016, which is herein incorporated by reference.

FIELD OF THE INVENTION

The present invention relates to self-assembled propylene-based bi-layer compositions having a skin layer comprising a propylene-based elastomer-toughened composition and a core layer comprising a propylene-based fiber-reinforced composition, and methods for production thereof.

BACKGROUND OF THE INVENTION

Polypropylene and polypropylene-based materials are commonly employed in structural compound applications, especially in automobiles. Physical properties that are important in selecting and engineering such materials include stiffness, toughness, dimensional ability, heat distortion temperature, and surface smoothness.

Isotactic propylene (iPP) is a plastic material of choice in these structural compound applications due to its low density, high melting point, and favorable balance between stiffness and toughness properties. However, due to the relatively high glass transition temperature (Tg) of iPP, i.e., around 0° C., elastomer fillers having a Tg of less than −40° C. are commonly added in iPP based compounds to enhance the toughness of these compounds at low temperatures. Typically, an iPP based compound must have an elastomeric content of greater than 15 wt % to be ductile at −20° C. Additionally, a reinforcing agent filler such as high stiffness fibers and inorganic fillers (e.g., talc) are typically added to iPP based compounds to raise their heat distortion temperature, modulus, and resistance to thermal expansion. As with elastomers, iPP based compounds typically have a reinforcing agent content of at least 15 wt %. More specifically, iPP based compounds typically contain glass fibers with a fiber content between 30% to 40 wt %.

However, elastomers and reinforcing agents introduced into iPP compounds using conventional methods often counteract the beneficial physical property enhancements of one another. For instance, while elastomers beneficially enhance toughness and ductility, these materials adversely affect the heat distortion temperature resistance and dimensional stability of iPP compounds (e.g., by lowering the modulus of the compound). Likewise, while reinforcing agents beneficially enhance heat distortion temperature resistance and dimensional stability, these materials adversely affect the toughness and ductility of iPP compounds. For this reason, the performance window of existing iPP compounds containing both elastomer and reinforcing agent fillers is quite limited.

The performance window of iPP compounds can be slightly extended by judiciously selecting either reinforcing agent or elastomer fillers so that the physical property enhancements gained by the addition of one offset the physical property diminishments incurred by the addition of the other. For example, by using high aspect ratio and surface treated fibers, it is possible to raise the modulus of an iPP compound per percent fiber addition more than the corresponding loss in modulus per percent elastomer addition.

However, although the performance window of iPP compounds can be slightly extended with better choices of suitable reinforcing agents and elastomer fillers, it cannot be fundamentally modified. Therefore, although iPP compounds have continuously made inroads into the replacement of metal-based structural materials, key load bearing structural components (e.g., the door frames of an automobile) are still based on metals.

Another means of addressing the performance needs of iPP based materials in structural automotive applications is to use multilayer laminates. One layer provides stiffness, dimensional stability, and heat distortion temperature performance, while another surface layer of different composition provides surface smoothness, paintability, and impact toughness. For example, JP 2008036932 A discloses a polypropylene-resin bilayered molded product useful for exterior portions of motor vehicles consisting of a skin layer which contains a first polypropylene resin and a core layer which contains a second polypropylene resin composition.

However, the use of multilayer laminates adds additional cost due to more complex manufacturing. Furthermore, lamination and coating of polypropylene compounds is complicated in that these compounds typically require an adhesive layer or adhesion promoter.

Accordingly, there is a need for propylene-based materials, especially iPP based materials, with an expanded performance window having both satisfactory stiffness and toughness properties and that do not require lamination or coating.

Other references of interest include: US 2013/0221569A1; U.S. Pat. No. 8,618,214B2; and WO 2013191307A1.

SUMMARY OF THE INVENTION

This invention fulfills the need for a propylene-based material with an expanded performance window and that does not require lamination or coating by providing novel self-assembled propylene-based bi-layer structural compositions that have a combination of both satisfactory toughness/ductility and rigidity properties and that self-assemble into a skin layer and a core layer without the aid of an adhesive layer or adhesion promoter.

The invention relates to a propylene-based bi-layer composition comprising a skin layer comprising 90 wt % or more of a propylene-based elastomer-toughened composition based on the weight of the skin layer and a core layer comprising 90 wt % or more of a propylene-based fiber-reinforced composition based on the weight of the core layer. The elastomer-toughened composition is formed from (i) a functionalized low molecular weight (LMW) propylene polymer having a number average molecular weight (Mn) within the range from 5,000 g/mol to 40,000 g/mol and (ii) at least one functionalized elastomer. The fiber-reinforced composition is formed from (i) a high molecular weight (HMW) propylene polymer having an Mn greater than 40,000 g/mol and (ii) reinforcing fibers. The elastomer-toughened composition and the fiber-reinforced composition self-assemble upon mixing into the skin layer and the core layer. Preferably, the self-assembly takes place within 5 seconds or less.

The inventive propylene-based bi-layer compositions can be produced using a process comprising: coupling (i) a LMW propylene polymer comprising a functional chain and having an Mn ranging from 5,000 g/mol to 40,000 g/mol and (ii) at least one elastomer comprising a functional chain to produce the propylene-based elastomer-toughened composition; blending (i) a HMW propylene polymer having an Mn greater than 40,000 g/mol and (ii) reinforcing fibers to produce the propylene-based fiber-reinforced composition; and blending the elastomer-toughened composition and the fiber-reinforced composition to form a mixture. The mixture self-assembles into a skin layer comprising 90 wt % or more of the elastomer-toughened composition based on the weight of the skin layer and a core layer comprising 90 wt % or more of the fiber-reinforced composition based on the weight of the core layer.

Definitions

The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic, and random symmetries.

The term "elastomer" shall mean any polymer exhibiting some degree of elasticity, where elasticity is the ability of a material that has been deformed by a force (such as by stretching) to return at least partially to its original dimensions once the force has been removed. The term elastomer is meant to include those materials known as plastomers that rubber-like properties and the processability of plastic, for instance Exact™ plastomers commercially available from ExxonMobil Chemical Co.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit".

A "propylene-based polymer" is a polymer or blend of polymers comprising at least 50 wt % propylene derived units, and includes homopolymers, copolymers, impact copolymers, and elastomeric copolymers. More particularly, "polypropylene" that is preferably used in the inventive propylene-based compositions is a homopolymer or copolymer comprising from 60 wt %, or 70 wt %, or 80 wt %, or 85 wt %, or 90 wt %, or 95 wt %, or 98 wt %, or 99 wt %, to 100 wt % propylene-derived units; comprising within the range of from 0 wt %, or 1 wt %, or 5 wt % to 10 wt %, or 15 wt %, or 20 wt %, or 30 wt %, or 40 wt % $C_2$ and/or $C_4$ to $C_{10}$ α-olefin derived units; and can be made by any desirable process using any desirable catalyst as is known in the art, such as a Ziegler-Natta catalyst, a metallocene catalyst, or other single-site catalyst, using solution, slurry, high pressure, or gas phase processes. Certain polypropylenes have within the range from 0.2 wt % or 0.5 wt % to 1 wt % or 2 wt % or 5 wt % ethylene-derived units. In any case, useful polypropylenes are preferably highly crystalline and have a DSC melting point temperature (second melt) $T_{m2}$ (ASTM D3418, with a 10° C./min heating rate) of at least 150° C., or 155° C., or 160° C., or 165° C., or within a range of from 130° C., or 135° C., or 140° C., or 150° C. to 155° C., or 160° C., or 170° C.

Generally speaking, crystallinity is a major influence on the heat of fusion and melting temperature. The term "crystalline," as used herein, characterizes those polymers which possess high degrees of inter- and intra-molecular order.

Preferably, polypropylenes useful in the invention have a heat of fusion (Hf) greater than 60 J/g, or 70 J/g, or 80 J/g, as determined by DSC analysis, or within a range from 60, or 70 J/g to 110, or 120, or 135 J/g. The heat of fusion is dependent on the composition of the polypropylene; the thermal energy for the highest order of polypropylene is estimated at 189 J/g, that is, 100% crystallinity is equal to a heat of fusion of 189 J/g. In this regard, the polypropylenes useful in the inventive compositions may have a heat of crystallization Hc within the range of from 80, or 85, or 90, or 100 J/g to 125, or 130, or 135 J/g; and a crystallization temperature Tc within the range of from 100, or 110, or 115, or 120° C. to 130, or 135, or 140, or 145° C.

The term "interfacial reactive compatabilization" refers to a procedure in which immiscible polymer blends are compatibilized by creating copolymers at the interface of the two polymers, wherein the polymers are in the solution or melt state.

DETAILED DESCRIPTION

Disclosed herein are self-assembled propylene-based bi-layer compositions having a skin layer comprising 90 wt % or more of a propylene-based elastomer-toughened composition and a core layer comprising 90 wt % or more of a propylene-based fiber-reinforced composition, and methods for producing the same. The performance window of the inventive compositions is enhanced over that of conventional polypropylene-based structural materials by concentrating the elastomer content of the compositions in the skin layer where toughening is truly needed, thereby allowing the core layer to remain stiff and dimensionally stable. The inventive compositions are useful in structural applications, particularly automotive applications. Additionally, these compositions are unique in that they do not require lamination or coating.

The self-assembled propylene-based bi-layer compositions generally comprise within the range from about 1 to about 50 wt % of the propylene-based elastomer-toughened composition, more preferably from about 5 to about 47.5 wt %, and ideally from about 7.5 to about 45%. Typically, the self-assembled propylene-based compositions have a total elastomeric content within from a low of about 1 wt %, alternatively a low of about 2 wt %, and alternatively a low of about 3 wt %, to a high of about 7 wt %, alternatively a high of about 9 wt %, and alternatively a high of about 10 wt %.

The self-assembled propylene-based bi-layer compositions generally comprise within the range from about 50 to about 99 wt % of the propylene-based fiber-reinforced composition, more preferably from about 52.5 to about 95 wt %, and ideally from about 55 to 92.5 wt %. Typically, the self-assembled propylene-based compositions have a total reinforcing fiber content within from a low of about 25 wt %, alternatively a low of about 30 wt %, and alternatively a low of about 35 wt %, to a high of about 45 wt %, alternatively a high of about 50 wt %, and alternatively a high of about 55 wt %.

Propylene-Based Elastomer-Toughened Composition

Generally, the propylene-based elastomer-toughened composition is formed from a low molecular weight propylene polymer and at least one elastomer. Typically, the propylene-based elastomer-toughened composition has a propylenic content within the range from about 45 wt % to about 85 wt %, more preferably from about 50 wt % to about 80 wt %, and ideally from about 55 wt % to about 75 wt %. Typically, the propylene-based elastomer-toughened composition has an elastomeric content within the range from about 15 wt % to 55 wt %, more preferably from about 20 wt % to about 50 wt %, and ideally from about 25 wt % to about 45 wt %.

Low Molecular Weight Propylene Polymer

The low molecular weight (LMW) propylene polymer preferably has a number average molecular weight (Mn) within the range from about 5,000 g/mol to about 50,000 g/mol, more preferably from about 10,000 g/mol to about 45,000 g/mol, and ideally from about 15,000 g/mol to about 40,000 g/mol. Typically, the LMW propylene polymer has a molecular weight distribution (MWD) of from 1.5, or 2.0, or 2.5, to 3.0, or 3.5, or 4.0, or 5.0, or 6.0, or 8.0. The LMW propylene polymer may have a melt flow rate ("MFR, 230° C., 2.16 kg, ASTM D1238) greater than 40 g/10 min. A preferred LMW propylene polymer is polypropylene. A preferred polypropylene is an isotactic polypropylene (iPP).

Generally, the LMW propylene polymer is functionalized, preferably end-functionalized. Preferred functional groups include, but are not limited to, vinyl, vinylidene, amine, carboxylic acid, hydroxyl, aldehyde, and combinations of two or more of the foregoing.

The LMW propylene polymer can be made by any suitable means. Vinyl/vinylidene-terminated polypropylene (VTPP) may be made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 A3) perfluorinated boron activator, for example as described in US 2012-0245299. Often, the VTPP is then further reacted to introduce an alternate functional group. For example, the VTPP may be aminated, (e.g., by reacting with ethylenediamine) to produce an amine end-functionalized polypropylene.

Elastomer

Useful elastomers are those having a Tg of less than 0° C. as measured by DSC (Differential Scanning Calorimetry). Particularly useful elastomers include diene-rubbers, such as styrene-butadiene rubber (SBR), cis-butadiene rubber (BR), natural rubber (NR); polyolefin plastomers, such as ethylene-butene, ethylene-hexene, and ethylene-octene plastomers; polyolefin elastomers, such as propylene-ethylene, propylene-hexene, ethylene-octene elastomers; and thermoplastic elastomers (TPE), such as hydrogenated styrene-butadiene (or isoprene) block copolymers, polyester, and polyamide TPE; and combinations of two or more of the foregoing. Particularly preferred elastomers include Exxelor™ polymer resins and Exact™ plastomers, both commercially available from ExxonMobil Chemical Co.

Generally, the elastomers useful in the invention are functionalized. Preferred elastomers are multifunctional. Suitable functional groups are those capable of reacting with the functional group of the LMW propylene polymer. Especially preferred elastomers are maleated or epoxy-functionalized, such as maleated ethylene-octene plastomer (commercially available as Exxelor™ plastomer 1840 from ExxonMobil Chemical Co.).

Optionally, compatibilizers can be incorporated into the elastomer to deliver finer elastomer dispersions. Useful compatibilizers include di-block copolymer polypropylene, such as poly(propylene-b-ethylene-co-propylene).

Formation of Propylene-Based Elastomer-Toughened Composition

Generally, formation of the propylene-based elastomer-toughened composition comprises coupling the LMW propylene polymer and elastomer in order that the elastomer will migrate along with the LMW propylene polymer to the skin layer during self-assembly of the inventive compositions. Ideally, the low molecular weight propylene polymer and the elastomer are interfacially reactively compatabilized. In such aspects, a functional chain of the LMW propylene polymer is typically coupled to a functional chain of the elastomer. Ideally, an end functional chain of the LMW propylene polymer is coupled to a multifunctional chain of the elastomer.

Preferably, the coupling is performed via melt reactive extrusion. The melt reactive extrusion can be carried out by combining the components in any suitable internal mixing device such as a Banbury™ mixer, Brabender™ mixer or preferably a mixer/extruder. Preferably, a twin screw extruder is used for extrusion mixing, ideally a co-rotating intermeshing twin screw extruder.

Suitable mixing rates can range from about 10 RPM to about 8,500 RPM. Preferably, the mixing rate can range from a low of about 10 RPM, 25 RPM, or 50 RPM to a high of about 500 RPM, 2,500 RPM, or 5,000 RPM. More preferably, the mixing rate can range from a low of about 10 RPM, 25 RPM, or 50 RPM to a high of about 200 RPM, 500 RPM, or 1,000 RPM. Preferably, the blending/mixing is performed at a rate noted above for 20 seconds to 1,000 seconds, more preferably from 30 seconds to 800 seconds, and ideally from 60 seconds to 600 seconds.

In any embodiment, the mixing temperature can range from about 120° C. to about 300° C. In any embodiment, the mixing temperature can range from a low of about 120° C., 130° C., or 140° C. to a high of about 250° C., 270° C., or 300° C. Preferably, the mixing temperature can range from a low of about 150° C., 175° C., or 180° C. to a high of about 230° C., 250° C., or 300° C.

Propylene-Based Fiber-Reinforced Composition

Generally, the propylene-based fiber-reinforced composition is formed from a high molecular weight propylene polymer and reinforcing fibers. Typically, the propylene-based fiber-reinforced composition has a propylenic content within the range from about 45 wt % to about 85 wt %, more preferably from about 50 wt % to about 80 wt %, and ideally from about 55 wt % to about 75 wt %. Typically, the propylene-based elastomer-toughened composition has a fiber content within the range from about 15 wt % to 55 wt %, more preferably from about 20 wt % to about 50 wt %, and ideally from about 25 wt % to about 45 wt %.

High Molecular Weight Propylene Polymer

The high molecular weight (HMW) propylene polymer preferably has within the range from 40,000 g/mol to 900,000 g/mol, more preferably from 45,000 g/mol to 750,000 g/mol, and ideally from 50,000 g/mol to 500,000 g/mol. Typically, the HMW propylene polymer has an MWD of from 1.5, or 2.0, or 2.5, to 3.0, or 3.5, or 4.0, or 5.0, or 6.0, or 8.0. The HMW propylene polymer may have an MFR (230° C., 2.16 kg, ASTM D1238) below 50 g/10 min. A preferred HMW propylene polymer is polypropylene. A preferred polypropylene is iPP.

Reinforcing Fibers

Useful reinforcing fibers include macro-, micro- and, nano-fibers of a flexible solid material and can be any known in the art. Examples include, but are not limited to: macro-fibers of glass, carbon or polyester; micro-fibers of magnesium oxysulfate (MOS) whiskers, wollastonite calcium metasilicate, or graphenes (e.g., exfoliated graphites and nanographene platelets); nano-fibers of halloysite aluminosilicate nanotubes, carbon nanofibers (CNF), multi-walled carbon nanotubes (MWNT), or single-wall carbon nanotubes (SWNT); and combinations of two or more of the foregoing.

Particularly useful fibers have a diameter of 1 nanometer (nm) to 5 microns. A preferred diameter is 5 nm to 1 micron. Useful fibers preferably exhibit an L/D ratio of 30 or more and more preferably 30 to 1,500.

Formation of Propylene-Based Fiber-Reinforced Composition

Generally, forming the propylene-based fiber-reinforced composition comprises blending the HMW propylene polymer and reinforcing fibers. The mixing/blending can be carried out by combining the components in any suitable internal mixing device such as a Banbury™ mixer, Brabender™ mixer or preferably a mixer/extruder. Preferably, a twin screw extruder is used for extrusion mixing, ideally a co-rotating intermeshing twin screw extruder.

Suitable mixing rates can range from about 10 RPM to about 8,500 RPM. Preferably, the mixing rate can range from a low of about 10 RPM, 25 RPM, or 50 RPM to a high of about 500 RPM, 2,500 RPM, or 5,000 RPM. More preferably, the mixing rate can range from a low of about 10 RPM, 25 RPM, or 50 RPM to a high of about 200 RPM, 500 RPM, or 1,000 RPM. Preferably, the blending/mixing is performed at a rate noted above for 20 seconds to 1,000 seconds, more preferably from 30 seconds to 800 seconds, and ideally from 60 seconds to 600 seconds.

In any embodiment, the mixing temperature can range from about 120° C. to about 300° C. In any embodiment, the mixing temperature can range from a low of about 120° C., 130° C., or 140° C. to a high of about 250° C., 270° C., or 300° C. Preferably, the mixing temperature can range from a low of about 150° C., 165° C., or 180° C. to a high of about 200° C., 270° C., or 300° C.

Often, the HMW propylene polymer and fibers are coupled via radical graft polymerization during blending in order that the fibers remain in the core layer during self-assembly of the inventive compositions. In such aspects, the reinforcing fibers are generally surface treated prior to radical graft polymerization.

Often, the reinforcing fibers are surface treated with an organic peroxide. The peroxide can be either in the solid or liquid form. To improve the feed consistency, the peroxide can be diluted with paraffinic or aromatic oils of low boiling points, particularly those having boiling points below 180° C. The low boiling points of the oils ensure their complete removal in extruders running at extrusion temperatures greater than 180° C. The organic peroxide is typically employed at from 0.01 to 5 wt % relative to the weight of the HMW propylene polymer. The solution or solid of the organic peroxide is typically added into the extruder directly after the introduction of the HMW propylene polymer and fibers during or after admixture of the batch.

Suitable organic peroxides include benzoyl peroxide, 1,4-dichlorobenzyl peroxide, 2,4-dichlorobenzyl peroxide, di-t-butyl peroxide, dicumyl peroxide, tertiary butyl-perbenzoate, and monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, tertiary-butyl-tertiary-butyl-tertiary-triphenyl peroxide, t-butyl perbenzoate, and combinations of two or more of the foregoing.

Alternatively or additionally, the fibers may be surface treated prior to radical grafting with the use of vinyl-silane coupling agents. Suitable silane-based coupling agents include, for example, chlorosilane, alkoxysilane, silazane, and specific silylizing agents. Examples include methyltrichlorosilane, dimethyldichlorosilane, trimethylchlorosilane, phenyltrichlorosilane, diphenyldichlorosilane, tetramethoxysilane, methyltrimethoxysilane, dimethyldimethoxysilane, ethyltrimethoxysilane, propyltrimethoxysilane, phenyltrimethoxysilane, diphenyldimethoxysilane, tetraethoxysilane, methyltriethoxysilane, dimethyldiethoxysilane, ethyltriethoxysilane, propyltriethoxysilane, phenyltriethoxysilane, diphenyldiethoxysilane, butyltrimethoxysilane, butyltriethoxysilane, isobutyltrimethoxysilane, hexyltrimethoxysilane, octyltrimethoxysilane, decyltrimethoxysilane, hexadecyltrimethoxysilane, trimethyltrimethoxysilane, hexamethyldisilazane, N,O-(bistrimethylsilyl)acetamide, N,N-bis(trimethylsilyl)urea, tert-butyldimethylchlorosilane, vinyltrichlorosilane, vinyltrimethoxysilane, vinyltriethoxysilane, vinyltriacethoxysilane, γ-methacryloxypropyltrimethoxysilane, -(3,4-epoxycyclohexyl)ethyltrimethoxysilane, γ-glycydoxypropyltrimethoxysilane, γ-glycydoxypropyltriethoxysilane, γ-glycydoxypropylmethyldiethoxysilane, γ-mercaptopropyltrimethoxysilane, γ-chloropropyltrimethoxysilane, and combinations of two or more of the foregoing.

The silane surface treatment requires the formation of stable condensation siloxane products which could be obtained on the surface of siliceous fillers and of fillers based on oxides of aluminum, zirconium, tin, titanium, and nickel. Less stable bonds are formed with oxides of boron, iron, and carbon. Fibers of alkali metal oxide compositions do not form stable bonds with silane coupling agent and are not amenable for coupling agent treatment. For silicate-type fibers, solutions of silane coupling agents having 5 to 30 wt % of coupling agent, preferably ethanol-based solutions, are applied to the fiber surfaces and allowed to stand for more than 5 minutes. Afterward, the treated fibers are dried at 100° C. to 120° C. for 10 minutes to 60 minutes.

Self-Assembly of Skin Layer and Core Layer

The inventive propylene-based bi-layer compositions are typically formed by blending the propylene-based elastomer-toughened composition and propylene-based fiber-reinforced composition and allowing the mixture of the two compositions to self-assemble into a skin layer comprising 90 wt % or more of the elastomer-toughened composition based on the weight of the skin layer and a core layer comprising 90 wt % or more of the fiber-reinforced composition based on the weight of the core layer. Generally, the mixture of the elastomer-toughened composition and fiber-reinforced composition self-assembles into the skin layer and the core layer in 5 seconds or less, more preferably 4 seconds less, more preferably 3 seconds or less, more preferably 2 seconds or less, and ideally 1 second or less.

The mixing/blending of the elastomer-toughened composition and fiber-reinforced composition can be carried out by combining the components in any suitable internal mixing device such as a Banbury™ mixer, Brabender™ mixer or preferably a mixer/extruder. Preferably, a twin screw extruder is used for extrusion mixing, ideally a co-rotating intermeshing twin screw extruder.

Suitable mixing rates can range from about 10 RPM to about 8,500 RPM. Preferably, the mixing rate can range from a low of about 10 RPM, 30 RPM, or 50 RPM to a high of about 500 RPM, 2,500 RPM, or 5,000 RPM. More preferably, the mixing rate can range from a low of about 10 RPM, 30 RPM, or 50 RPM to a high of about 200 RPM, 500 RPM, or 1,000 RPM. Preferably, the blending/mixing is performed at a rate noted above for 20 seconds to 600 seconds, more preferably from 30 seconds to 300 seconds, and ideally from 60 seconds to 180 seconds.

In any embodiment, the mixing temperature can range from about 120° C. to about 300° C. In any embodiment, the mixing temperature can range from a low of about 120° C., 130° C., or 140° C. to a high of about 250° C., 270° C., or 300° C. Preferably, the mixing temperature can range from a low of about 150° C., 165° C., or 185° C. to a high of about 200° C., 270° C., or 300° C.

In any embodiment, the mixture of the elastomer-toughened composition and fiber-reinforced composition may be discharged from the internal mixing device into an injection molder. In such aspects, self-assembly of the elastomer-toughened composition and fiber-reinforced composition into the skin layer and the core layer takes place during the injection molding cycle. In any embodiment, the operating pressure of the injection molder can range from a low of about 25 psig, 50 psig, or 100 psig to a high of about 500 psig, 750 psig, or 1,000 psig. Preferably, the operating pressure can range from a low of about 50 psig, 100 psig, or 250 psig to a high of about 400 psig, 600 psig, or 750 psig. Preferably, the injection molder has an injection cycle time of 5 seconds or less, more preferably 4 seconds less, more preferably 3 seconds or less, more preferably 2 seconds or less, and ideally 1 second or less.

Typically, the thickness of the skin layer comprises within the range from a low of about 5%, alternatively a low of about 10%, or alternatively a low of about 15% to a high of about 18%, alternatively a high of about 20%, or alternatively a high of about 25% of the total thickness of the self-assembled propylene-based composition. Where self-assembly of the propylene-based compositions takes place within an injection molder, the fabricated injection molded parts typically have a total thickness within the range from a low of about 3.0 mm, to a high of about 10 mm.

Preferably, the self-assembled propylene-based bi-layer compositions exhibit a gradual transition from the skin layer to the core layer. Specifically, the weight concentration of the elastomer-toughened composition gradually decreases from a maximum concentration at the surface of the skin layer to a minimum concentration within the core layer. Without wishing to be bound by theory, it is believed that this gradual transition is highly desirable as it minimizes the possibility of a stress concentration at the transition between the skin layer and the core layer and weakening of the resulting compound.

Mechanical Properties of Self-Assembled Propylene-Based Bi-Layer Compositions

The self-assembled propylene-based bi-layer compositions exhibit an advantageous combination of both exemplary toughness/ductility and rigidity properties. With respect to toughness and ductility, the inventive compositions typically have an impact resistance within the range from a low of about 1.00 kJ/m$^2$ to a high of about 5.00 kJ/m$^2$ as measured in accordance with ASTM D256. With respect to rigidity, the inventive compositions typically have a tensile modulus (Young's modulus) within the range from a low of about 1,000 MPa, to a high of about 3,500 MPa.

INDUSTRIAL APPLICABILITY

The novel self-assembled propylene-based bi-layer compositions of the present disclosure can be engineered to meet physical properties and performance specifications as structural materials in diverse industrial applications, such as automotive and building construction. Physical properties that are important in selecting and engineering such materials include stiffness, toughness, dimensional stability, heat distortion temperature, and surface smoothness. The self-assembled propylene-based bi-layer compositions are adapted to meeting performance specifications in some or all of the properties simultaneously.

The various descriptive elements and numerical ranges disclosed herein for the inventive self-assembled propylene-based bi-layer compositions and process to make such compositions can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Synthesis of Functionalized LMW iPP
Synthesis of Vinyl/Vinylidene-Terminated Isotactic Polypropylene (VTPP)

Isohexane solvent and propylene monomer were first purified using a three-column purification system. The purified solvent and monomer were passed through a chiller and cooled to about −15° C. The purification system consisted of an Oxiclear™ column (Model #RGP-R1-500 from Labclear) followed by a 5 Å and a 3 Å molecular sieve columns. The molecular sieve material was purchased from Aldrich.

The catalyst used to form the VTPP was rac-dimethylsily bis(2-methylindenyl) hafnium dimethyl catalyst preactivated with N,N-dimethylanilinium tetrakis(heptafluoro-2-naphthyl) borate at a molar ratio of about 1:1 in 900 mL of toluene to form a catalyst solution.

As an impurity scavenger, 250 mL of tri-n-octyl aluminum (TNOA) (25 wt % in hexane, Sigma Aldrich) was diluted in 22.83 kg of isohexane to form a TNOA scavenger solution, which was stored in a 37.9 L cylinder under nitrogen protection. This scavenger solution was used for all polymerization runs until about 90% of consumption, and then a new batch was prepared. Pumping rates of the TNOA solution varied from polymerization reaction to reaction, ranging from 0 (no scavenger) to 4 ml per minute.

The polymerizations were performed in a liquid-filled, 0.5 L stainless steel autoclave continuous stirred-tank solution reactor equipped with a stirrer, a water cooling/steam heating element with a temperature controller, and a pressure controller. The autoclave was prepared by a continuous nitrogen purge at high temperature, followed by pumping isohexanes and the TNOA scavenger solution through the autoclave for at least one hour.

After preparation, the reactor was heated/cooled to a temperature of about 80° C. using a water/steam mixture flowing through the reactor jacket and controlled at a set pressure with controlled solvent flow. Once a steady state of operation was reached, the chilled isohexane solvent and propylene monomer were mixed in a manifold and fed into the autoclave through a single tube at an isohexane solvent feed rate of 52.2 g/min and a propylene monomer feed rate of 14 g/min. The catalyst solution was fed into the autoclave by a metering pump through a separated line. The feed rate of the catalyst solution was also adjusted to achieve a target conversion of around 90%. An automatic temperature control system was used to control and maintain the reactor at a set temperature. Onset of polymerization activity was determined by observations of a viscous product and lower temperature of water-steam mixture. All liquid flow rates were measured using Brooksfield mass flow meters.

Once the activity was established and the system reached equilibrium, the autoclave was lined out by continuously operating the system under the established condition for a time period of at least five times of mean residence time prior to sample collection. The resulting mixture, containing mostly solvent, polymer, and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g. Sample characteristics of the synthesized VTPP are summarized in Table 1.

TABLE 1

| | |
|---|---|
| Yield (g/min) | 12.74 |
| Conversion (%) | 91.02 |
| Viscosity @190° C. (centipoise) | 12450 |
| Mn (g/mol) | 25133 |
| Mw (g/mol) | 64979 |
| Mz (g/mol) | 120838 |
| MWD | 2.59 |
| g'vis | 0.929 |
| Peak Crystallization Temperature (° C.) | 94.4 |
| Peak Melting Temperature (° C.) | 129.9 |
| Heat of Fusion (J/g) | 83.6 |
| Vinyls/1000 C | 0.04 |
| Vinylenes/1000 C | 0.01 |
| Vinylidenes/1000 C | 0.18 |
| Trisubstituted Olefin/1000 C | 0.04 |

Preparation of Amine-Functionalized Isotactic Polypropylene (AMPP)

100 g of the synthesized VTPP, 2.35 g of maleic anhydride (24.0 mmol), and 0.441 g of 2,4,6-tri(t-butyl)phenol (2.00 mmol) were combined with 40 mL m-xylenes in a thick walled glass flask under a nitrogen atmosphere. The flask was sealed with a Teflon™ cap fitted with an o-ring and the mixture was kept heated to 205° C. in an oil bath for three days. Afterward, the mixture was poured into 1400 mL of toluene kept at reflux.

The resulting mixture was cooled slightly and 25.2 g of ethylenediamine (419 mmol) was added in one portion. The flask was then fitted with a Dean-Stark trap and the mixture was heated to reflux for 4 hours. The mixture was then cooled to ambient temperature and the solid product that formed (AMPP) was collected on a glass frit. This product was washed with toluene (3×500 mL) and then with acetone (3×700 mL). The product was then dried in a vacuum oven at a temperature of about 70° C. for three days to afford 98 g of a white solid. The solid was analyzed using $^1$H-NMR spectroscopy ($CDCl_3$ as the solvent) to confirm the absence of vinylidene resonances.

Preparation of Propylene-Based Elastomer-Toughened Composition

The propylene-based elastomer-toughened (PBET) composition was formed by reacting the synthesized AmiPP with Exxelor™ plastomer 1840 (ExxonMobil Chemical Co.), a maleated ethylene-octene plastomer having a specific gravity of 0.88. The AMPP and plastomer components were pelletized and a pellet blend of the two components was fed at a rate of 2.5 cc/min to a Nano-16 twin screw extruder (American Leistritz Extruder) operating at 180° C. and 50 RPM (with a corresponding 10-minute residence time). The resulting PBET composition contained about 60 wt % AMPP derived units and about 40 wt % plastomer derived units.

Interfacial reactive compatibilization between the chain end amine of the AMPP and the maleic anhydride moiety of the plastomer resulted in fine dispersions of the plastomer throughout the AMPP and provided a link between the plastomer and the AMPP sufficient to allow joint surface migration of the plastomer with the AMPP during self-assembly of the inventive propylene-based bi-layer compositions.

Preparation of Propylene-Based Fiber-Reinforced Composition

The propylene-based fiber-reinforced (PBFR) composition was formed by reactively grafting Hyperform™ HPR-803i reinforcing agent (Milliken & Company), a fiber comprising about 99% magnesium oxysulfate (MOS), with iPP having an Mw of 120,000, a polydispersity of 4, and an MFR of 4.5 g/10 min (ExxonMobil Chemical Co.). The MOS fibers were first dried in an oven at about 120° C. overnight. The dried MOS fibers were dusted and treated by blending with 1% magnesium oxide (an acid scavenger), 1% magnesium stearate (an anti-clumping lubricant), and 0.5% (1,1,4,4-tetramethyltetramethylene)bis(tert-butyl peroxide) (commercially available as Luperox™ 101 polymer initiator from Arkema). The iPP was pelletized and a dry blend of the iPP pellets with the treated fibers was fed at a rate of 2.5 cc/min to a Nano-16 twin screw extruder (American Leistritz Extruder) operating at 180° C. and 50 RPM (with a corresponding 10-minute residence time). The resulting PBFR composition contained about 60 wt % iPP derived units and about 40 wt % fiber derived units.

Example 1-Example 4: Inventive Examples of Self-Assembled Propylene-Based Bi-Layer Compounds A series of four inventive self-assembled propylene-based bi-layer compounds, Ex. 1-4, were prepared into Izod impact testing and tensile testing bars by charging various ratios of dry-blended PBET and PBFR compositions, as shown in Table 2, into a lab scale XPlore™ MC 5 miniature twin screw extruder (XPlore Instruments B.V.) operating at 50 RPM and 185° C. for three minutes and then discharging the mixed compositions into an XPlore™ IM 5.5 micro injection molder (XPlore Instruments B.V.) operating at 100 psig with a one second injection cycle.

The injection molded bars were cryo-sectioned using a cryomicrotome commercially available from Leica Biosystems, a division of Danaher Corporation, for optical microscopy (OM) and scanning electron microscopy (SEM) examinations. As shown in Table 2, the PBET composition successfully migrated to the surface of each of Ex. 1-4 to develop a skin layer within the one second injection cycle.

The skin layer thicknesses of Ex. 1-4 were measured directly from the OM examination as corresponding to the distance from the outer edge of the molded bar to the position on the micrograph showing the beginning of the development of polypropylene spherulitic structures, which signifies the start of the core layer.

As also seen in Table 2, the thickness of the skin layer increases as the amount of the PBET composition increases until reaching a plateau thickness of about 0.3 mm at the given injection molding cycle time of one second.

TABLE 2

| Example | PBET Composition Amount | PBFR Composition Amount | Skin Thickness |
|---|---|---|---|
| Ex. 1 | 10 wt % | 90 wt % | ~200 microns |
| Ex. 2 | 20 wt % | 80 wt % | ~300 microns |
| Ex. 3 | 30 wt % | 70 wt % | ~300 microns |
| Ex. 4 | 40 wt % | 60 wt % | ~275 microns |

From the SEM micrograph of Ex. 4, it was observed that the transition from the skin layer to the core layer was gradual without a sharp transition, as desired to minimize the possibility of stress concentration at the transition.

Mechanical Properties of Ex. 1-4 and Comparative Example

A comparative example, C1, was prepared by injection molding the PBFR composition into Izod impact testing and tensile testing bars.

The Izod impact resistance values of Ex. 1-4 and C1 with the samples having a temperature of about −50° C. were determined using ASTM D256 (Method A). Higher impact resistance values indicate a tougher and more ductile material.

The tensile modulus values of Ex. 1-4 and C1 with the samples having a temperature of about 21° C. were determined using ASTM D638 (Type I bar, 5 cm/min). Higher tensile modulus values indicate a more rigid material having a higher resistance to deformation. The results of these tests are summarized in Table 3.

TABLE 3

| Composition | Izod Impact (kJ/m$^2$) | Tensile Modulus (MPa) |
|---|---|---|
| C1 | Break | 4,015 |
| Ex. 1 | 2.20 | 3,370 |
| Ex. 2 | 2.60 | 2,632 |
| Ex. 3 | 2.15 | 2,039 |
| Ex. 4 | 2.60 | 1,588 |

Conventional iPP based compounds typically require at least 15 wt % elastomer content to be ductile at −20° C. It would be expected that an even higher elastomeric content would be required for iPP compounds to be ductile at −50° C. Therefore, it is not surprising that C1, containing no elastomeric content, broke at −50° C. However, Ex. 1-4, having an elastomeric content ranging from only 4 wt % (Ex. 1) to 16 wt % (Ex. 4) did not break at −50° C. as would be expected from conventional iPP compounds. Rather, each of Ex. 1-4 exhibited an impact strength of at least 2.15 kJ/m$^2$, demonstrating the enhanced toughness and ductility of the inventive compositions.

As also seen in Table 3, each of Ex. 1-4 displayed a Young's modulus of at least 1,500 MPa, illustrating that the inventive compositions maintained high rigidity despite having elastomeric content. More specifically, the Young's modulus values of the inventive compositions ranged from 40% to over 80% that of C1, which had no elastomeric content.

Ex. 1 (comprising 54 wt % HMW iPP derived content, 16 wt % LMW iPP derived content, 36 wt % MOS fibers derived content, and 4 wt % of elastomer derived content) exhibited an especially advantageous combination of toughness/ductility and rigidity, displaying an impact strength of 2.20 kJ/m$^2$ and a Young's modulus of 3,370 MPa.

Experimental Test Methods

All molecular weights are number average in g/mol unless otherwise noted. Unless otherwise noted, physical and chemical properties described herein are measured using the following test methods.

| Test Procedures | |
|---|---|
| Melting Temperature (Tm) | DSC (see below) |
| Crystallization Temperature (Tc) | DSC (see below) |
| Heat of Fusion (Hf) | DSC (see below) |
| $M_n$, $M_w$, and $M_w/M_n$ | GPC (see below) |
| Branching Index (g'vis) | SEC |
| Injection Molding | ASTM D 4101 |
| Test Specimen Conditioning | ASTM D 618, Procedure A |
| Polypropylene tacticity | $^{13}$C-NMR |
| Olefin content in propylene copolymers | $^{13}$C-NMR |
| Vinyl/Vinylene/Vinylidene content in propylene copolymers | $^1$H-NMR |

Gel Permeation Chromatography (GPC)

Molecular weights (number average molecular weight (Mn) and weight average molecular weight (Mw)) are determined using a Polymer Laboratories Model 220 high temperature GPC-SEC equipped with on-line differential refractive index (DRI), light scattering (LS), and viscometer (VIS) detectors (so called GPC-3D, Gel Permeation Chromatography-3 Detectors). The GPC-SEC uses three Polymer Laboratories PLgel 10 m Mixed-B columns for separation using a flow rate of 0.54 ml/min and a nominal injection volume of 300 μL. The detectors and columns are contained in an oven maintained at 135° C. Polysytrene was used to calibrate the instrument.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules:

$$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

Differential Scanning Calorimetry (DSC)

Crystallization temperature ($T_c$) and melting temperature (or melting point, $T_m$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature (22° C.). Melting data (first heat) is acquired by heating the sample to at least 30° C. above its melting temperature, typically 220° C. for polypropylene, at a heating rate of 10° C./min. The sample is held for at least 5 minutes at 220° C. to destroy its thermal history. Crystallization data are acquired by cooling the sample from the melt to at least 50° C. below the crystallization temperature, typically −50° C. for polypropylene, at a cooling rate of 20° C./min. The sample is held at −50° C. for at least 5 minutes, and finally heated at 10° C./min to 220° C. (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, Hf, upon melting or heat of crystallization, Hc, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, 47 APPLIED SPECTROSCOPY 1128-1130 (1993). For a propylene ethylene copolymer containing greater than 75 wt % propylene, the comonomer content (ethylene content) of such a polymer can be measured as follows: A thin homogeneous film is pressed at a temperature of 150° C. or greater, and mounted on a Perkin Elmer PE 1760 infrared spectrophotometer. A full spectrum of the sample from 600 cm$^{-1}$ to 4000 cm$^{-1}$ is recorded and the monomer wt % of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher. For propylene ethylene copolymers having 75 wt % or less propylene content, the comonomer (ethylene) content can be measured using the procedure described in Wheeler and Willis.

Specific Embodiments

Having described and demonstrated the various aspects of the inventive self-assembled propylene-based bi-layer compositions, described here in numbered paragraphs is:

P1. A propylene-based bi-layer composition comprising: a skin layer comprising 90 wt % or more of a propylene-based elastomer-toughened composition based on the weight of the skin layer and a core layer comprising 90 wt % or more of a propylene-based fiber-reinforced composition based on the weight of the core layer, wherein the elastomer-toughened composition is formed from a functionalized low molecular weight (LMW) propylene polymer having a number average molecular weight (Mn) within the range from 5,000 g/mol to 40,000 g/mol and at least one functionalized elastomer, wherein the fiber-reinforced composition is formed from a high molecular weight (HMW) propylene polymer having an Mn greater than 40,000 g/mol and reinforcing fibers, and wherein the elastomer-toughened composition and the fiber-reinforced composition self-assemble upon mixing into the skin layer and the core layer.

P2. The composition of previous numbered paragraph 1, wherein the elastomer-toughened composition and the fiber-reinforced composition self-assemble upon mixing into the skin layer and the core layer in 5 seconds or less.

P3. The composition of any one of the previous numbered paragraphs, wherein the elastomer-toughened composition is present in the propylene-based bi-layer composition within the range from 1-50 wt %, and wherein the fiber-reinforced composition is present in the propylene-based bi-layer composition within the range from 50-99 wt %.

P4. The composition of any one of the previous numbered paragraphs, wherein the elastomer-toughened composition has an elastomeric content within the range from 14-55 wt %, and wherein the fiber-reinforced composition has a reinforcing fiber content within the range from 14-60 wt %.

P5. The composition of any one of the previous numbered paragraphs, wherein the LMW propylene polymer and/or the HMW propylene polymer comprises isotactic polypropylene (iPP).

P6. The composition of any one of the previous numbered paragraphs, wherein the LMW propylene polymer comprises a functional group selected from the group consisting of vinyl, vinylidene, amine, carboxylic acid, hydroxyl, aldehyde, and combinations thereof.

P7. The composition of any one of the previous numbered paragraphs, wherein the at least one elastomer is derivatized from a compound selected from the group consisting of polyolefin elastomers, ethylene-butene plastomers, ethylene-hexene plastomers, ethylene-octene plastomers, propylene-ethylene copolymers, propylene-hexene copolymers, ethylene-octene elastomers, acrylic based elastomers, diene rubbers, styrene-butadiene rubber, cis-butadiene rubber, natural rubber, hydrogenated styrene-butadiene (or isoprene) block copolymers, nitrile based elastomers, silicone based elastomers, and combinations thereof.

P8. The composition of any one of the previous numbered paragraphs, wherein the weight concentration of the elastomer-toughened composition gradually decreases from a maximum concentration at the surface of the skin layer to a minimum concentration within the core layer.

P9. The composition of any one of the previous numbered paragraphs, wherein the reinforcing fibers are surface treated.

P10. The composition of any one of the previous numbered paragraphs, wherein the reinforcing fibers are macrofibers selected from the group consisting of glass fibers, carbon fibers, polyester fibers, and mixtures thereof.

P11. The composition of any one of the previous numbered paragraphs, wherein the reinforcing fibers are microfibers selected from the group consisting of calcium metasilicate whiskers, magnesium oxysulfate whiskers, graphenes, and mixtures thereof.

P12. The composition of any one of the previous numbered paragraphs, wherein the reinforcing fibers are nanofibers selected from the group consisting of carbon nanofibers, carbon nanotubes, aluminosilicate nanotubes, and mixtures thereof.

P13. The composition of any one of the previous numbered paragraphs, wherein the thickness of the skin layer is at least 5% of the total thickness of the propylene-based bi-layer composition.

P14. The composition of any one of the previous numbered paragraphs, wherein the propylene-based bi-layer composition has an impact resistance of at least 2.15 kJ/m$^2$ as measured in accordance with ASTM D256, and wherein the composition has a Young's modulus of at least 1,500 MPa.

P15. An injection molded article comprising the propylene-based bi-layer composition of any one of the previous numbered paragraphs.

P16. A process for producing a propylene-based bi-layer composition comprising: coupling (i) a LMW propylene polymer comprising a functional chain and having an Mn ranging from 5,000 g/mol to 40,000 g/mol and (ii) at least one elastomer comprising a functional chain to produce a propylene-based elastomer-toughened composition, wherein the LMW propylene polymer and the at least one elastomer are coupled via the two functional chains; blending (i) a HMW propylene polymer having an Mn greater than 40,000 g/mol and (ii) reinforcing fibers to produce a propylene-based fiber-reinforced composition; and blending the elastomer-toughened composition and the fiber-reinforced composition to form a mixture, wherein the mixture self-assembles into a skin layer comprising 90 wt % or more of the elastomer-toughened composition based on the weight of the skin layer and a core layer comprising 90 wt % or more of the fiber-reinforced composition based on the weight of the core layer.

P17. The process of previous numbered paragraph 16, wherein the mixture self-assembles into the skin layer and the core layer in 5 seconds or less.

P18. The process of previous numbered paragraphs 16 or 17, wherein the LMW propylene polymer and/or the HMW propylene polymer comprises iPP.

P19. The process of any one of previous numbered paragraphs 16 to 18, further comprising discharging the mixture into an injection molder having an injection cycle time of 1 second or less at a pressure ranging from 50 psig to 750 psig, wherein the self-assembly takes place within the injection cycle time.

P20. The process of any one of previous numbered paragraphs 16 to 19, wherein coupling the LMW propylene polymer and the at least one elastomer comprises reactive extrusion blending at a temperature ranging from 120° C. to 250° C.

P21. The process of any one of previous numbered paragraphs 16 to 20, wherein the functional chain of the LMW propylene polymer comprises a functional group selected from the group consisting of vinyl, vinylidene, amine, carboxylic acid, hydroxyl, aldehyde, and combinations thereof.

P22. The process of any one of previous numbered paragraphs 16 to 21, wherein the at least one elastomer is derivatized from a compound selected from the group consisting of polyolefin elastomers, ethylene-butene plastomers, ethylene-hexene plastomers, ethylene-octene plastomers, propylene-ethylene copolymers, propylene-hexene copolymers, ethylene-octene elastomers, acrylic based elastomers, diene rubbers, styrene-butadiene rubber, cis-butadiene rubber, natural rubber, hydrogenated styrene-butadiene (or isoprene) block copolymers, nitrile based elastomers, silicone based elastomers, and combinations thereof.

P23. The process of any one of previous numbered paragraphs 16 to 22, wherein blending the HMW propylene polymer and the surface treated fibers comprises radical graft polymerization, and wherein the reinforcing fibers have a diameter ranging from 1 nm to 5 microns.

P24. The process of previous numbered paragraph 23, wherein prior to blending the reinforcing fibers are surface treated in the presence of an organic peroxide, wherein the organic peroxide is selected from the group consisting of benzoyl peroxide, 1,4-dichlorobenzyl peroxide, 2,4-dichlorobenzyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, tertiary-butyl-tertiary-butyl-tertiary-triphenyl peroxide, t-butyl perbenzoate, and combinations thereof.

P25. The process of previous numbered paragraph 23, wherein prior to blending the reinforcing fibers are surface treated in the presence of a vinyl silane coupling agent.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein, but rather that the claims be construed as encompassing all the features of patentable novelty which reside herein, including all features which would be treated as equivalents thereof by those skilled in the art to which this disclosure pertains.

For all jurisdictions in which the doctrine of "incorporation by reference" applies, all of the test methods, patent publications, patents and reference articles are hereby incorporated by reference either in their entirety or for the relevant portion for which they are referenced.

When numerical lower limits and numerical upper limits are listed herein, ranges from any lower limit to any upper limit are contemplated. The term "comprising" is synonymous with the term "including". Likewise whenever a composition, an element or a group of components is preceded with the transitional phrase "comprising", it is understood that we also contemplate the same composition or group of components with transitional phrases "consisting essentially of", "consisting of", "selected from the group of consisting of", or "is" preceding the recitation of the composition, component, or components, and vice versa.

The invention claimed is:

1. A propylene-based bi-layer composition comprising:
a skin layer comprising 90 wt % or more of a propylene-based elastomer-toughened composition based on the weight of the skin layer, wherein the skin layer is from about 200 to about 300 microns thick; and
a core layer comprising 90 wt % or more of a propylene-based fiber-reinforced composition based on the weight of the core layer,
wherein the elastomer-toughened composition is formed from (i) a functionalized low molecular weight (LMW) propylene polymer having a number average molecular weight (Mn) within the range from 5,000 g/mol to 40,000 g/mol, wherein the LMW propylene polymer comprises a functional group selected from the group consisting of vinyl, vinylidene and combinations thereof, and (ii) at least one functionalized elastomer, wherein a functional chain of the low molecular weight propylene polymer is coupled to a functional chain of the at least one functionalized elastomer;
wherein the fiber-reinforced composition is formed from (i) a high molecular weight (HMW) propylene polymer having an Mn greater than 40,000 g/mol and (ii) reinforcing fibers,
wherein the weight concentration of the elastomer-toughened composition gradually decreases from a maximum concentration at the surface of the skin layer to a minimum concentration within the core layer,
wherein the elastomer-toughened composition and the fiber-reinforced composition self-assemble upon mixing into the skin layer and the core layer, and
wherein the thickness of the skin layer is from about 5% to about 25% of the total thickness of the propylene-based bi-layer composition.

2. The propylene-based bi-layer composition of claim 1, wherein the elastomer-toughened composition and the fiber-reinforced composition self-assemble upon mixing into the skin layer and the core layer in 5 seconds or less.

3. The propylene-based bi-layer composition of claim 1, wherein the elastomer-toughened composition is present in the propylene-based bi-layer composition within the range from 1-50 wt %, and wherein the fiber-reinforced composition is present in the propylene-based bi-layer composition within the range from 50-99 wt %.

4. The propylene-based bi-layer composition of claim 1, wherein the elastomer-toughened composition has an elastomeric content within the range from 14-55 wt %, based on the weight of the elastomer-toughened composition.

5. The propylene-based bi-layer composition of claim 1, wherein the LMW propylene polymer and/or the HMW propylene polymer comprises isotactic polypropylene (iPP).

6. The propylene-based bi-layer composition of claim 1, wherein the LMW propylene polymer further comprises a functional group selected from the group consisting of amine, carboxylic acid, hydroxyl, aldehyde, and combinations thereof.

7. The propylene-based bi-layer composition of claim 1, wherein the at least one elastomer is derivatized from a compound selected from the group consisting of polyolefin elastomers, ethylene-butene plastomers, ethylene-hexene plastomers, ethylene-octene plastomers, propylene-ethylene copolymers, propylene-hexene copolymers, ethylene-octene elastomers, acrylic based elastomers, diene rubbers, styrene-butadiene rubber, cis-butadiene rubber, natural rubber, hydrogenated styrene-butadiene (or isoprene) block copolymers, nitrile based elastomers, silicone based elastomers, and combinations thereof.

8. The propylene-based bi-layer composition of claim 1, wherein the reinforcing fibers are surface treated.

9. The propylene-based bi-layer composition of claim 1, wherein the reinforcing fibers are macrofibers selected from the group consisting of glass fibers, carbon fibers, polyester fibers, and mixtures thereof.

10. The propylene-based bi-layer composition of claim 1, wherein the reinforcing fibers are microfibers selected from the group consisting of calcium metasilicate whiskers, magnesium oxysulfate whiskers, graphenes, and mixtures thereof.

11. The propylene-based bi-layer composition of claim 1, wherein the reinforcing fibers are nanofibers selected from the group consisting of carbon nanofibers, carbon nanotubes, aluminosilicate nanotubes, and mixtures thereof.

12. The propylene-based bi-layer composition of claim 1, wherein the thickness of the skin layer is from at least 10% to about 20% of the total thickness of the propylene-based bi-layer composition.

13. The propylene-based bi-layer composition of claim 1, wherein the composition has an impact resistance of at least 2.15 kJ/m² and a Young's modulus of at least 1,500 MPa.

14. The propylene-based bi-layer composition of claim 1, wherein the elastomer-toughened composition is present in the propylene-based bi-layer composition within the range from 7.5-45 wt %, and wherein the fiber-reinforced composition is present in the propylene-based bi-layer composition within the range from 92.5-55 wt %.

15. The propylene-based bi-layer composition of claim 1, wherein the fiber-reinforced composition has a reinforcing fiber content within the range from 14 to 60 wt % based on the weight of the fiber-reinforced composition.

16. The propylene-based bi-layer composition of claim 1, wherein the elastomer-toughened composition has an elastomeric content within the range from 25 to 45 wt % based on the weight of the elastomer-toughened composition.

17. The propylene-based bi-layer composition of claim 1, wherein the fiber-reinforced composition has a reinforcing fiber content from 25 to 45 wt % based on the weight of the fiber-reinforced composition.

18. The propylene-based bi-layer composition of claim 1, wherein the fiber-reinforced composition is formed from (i) a high molecular weight (HMW) propylene polymer having an Mn from 50,000 to 500,000 g/mol.

19. The propylene-based bi-layer composition of claim 1, wherein the composition comprises:

7.5 to 45 wt % of the propylene-based elastomer toughened composition, based on the total weight of the propylene-based bi-layer composition; and 55 to 92.5 wt % of the propylene-based fiber-reinforced composition, based on the total weight of the propylene-based bi-layer composition.

20. The propylene-based bi-layer composition of claim 1, wherein the skin layer is from 15 to 25% of the total thickness of the propylene-based bi-layer composition.

\* \* \* \* \*